Feb. 26, 1929.
B. L. SINGLEY
STEREOSCOPE
Filed Dec. 20, 1927
1,703,787
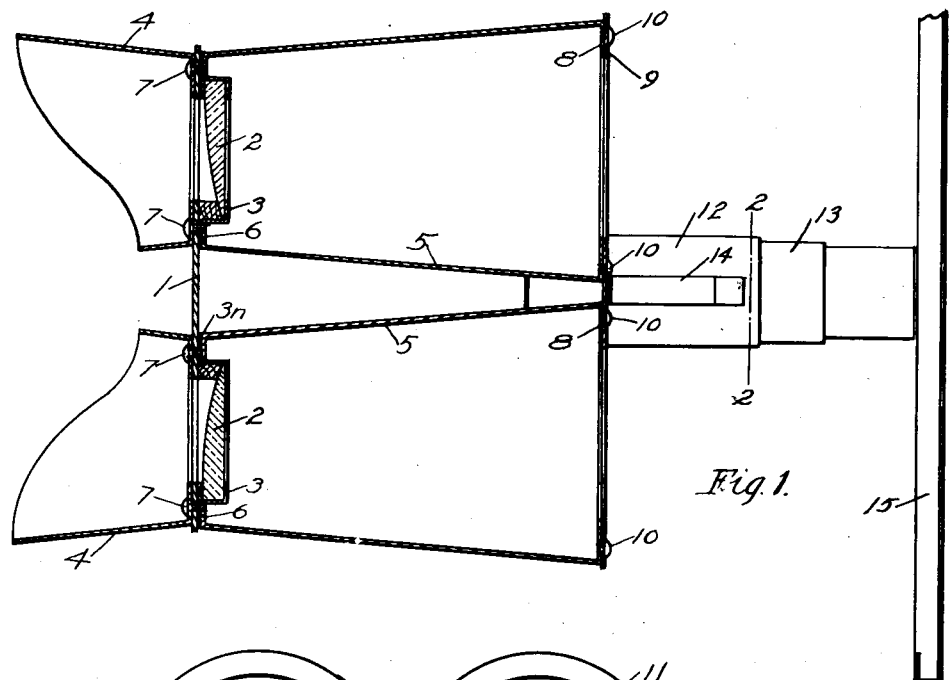
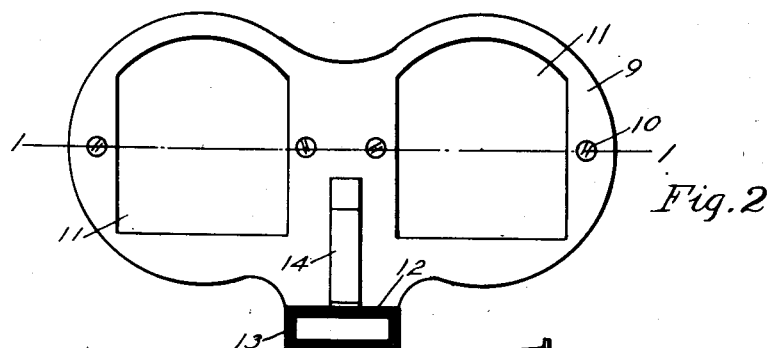
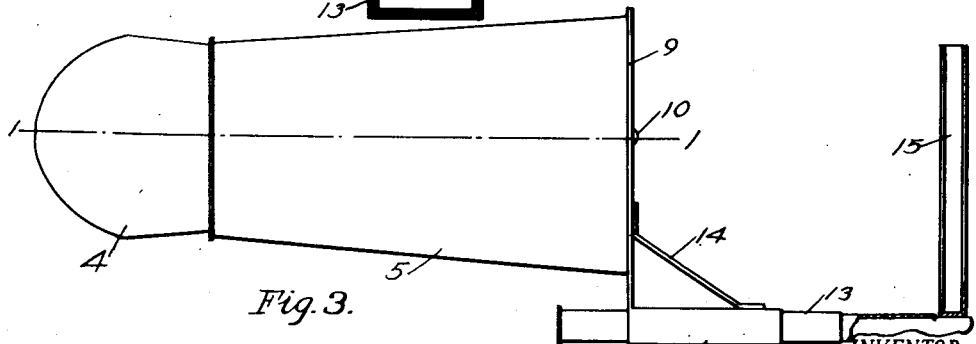
INVENTOR.
Benneville L. Singley
BY
ATTORNEYS.

Patented Feb. 26, 1929.

1,703.787

UNITED STATES PATENT OFFICE

BENNEVILLE L. SINGLEY, OF MEADVILLE, PENNSYLVANIA, ASSIGNOR TO KEYSTONE VIEW COMPANY, OF MEADVILLE, PENNSYLVANIA, A CORPORATION OF PENNSYLVANIA.

STEREOSCOPE.

Application filed December 20, 1927. Serial No. 241,282.

In stereoscopes as at present made the space between the lens and the view is ordinarily unobstructed except for a partition extending slightly in front of the lenses preventing the screening sides of the view from the opposite lenses. I have found that by enclosing the vision space between the lens and the view, thus concentrating the view, as it were, a more vivid and satisfactory impression is given both from the effect of concentrating the possible vision and also from any reflecting that may occur on the lenses. Features and details of the invention will appear more fully from the specification and claims.

A preferred exemplification of the invention is illustrated in the accompanying drawings as follows:—

Fig. 1 shows a central horizontal section on the line 1—1 in Figs. 2 and 3.

Fig. 2 a section on the line 2—2 in Fig. 1.

Fig. 3 a side elevation of the device.

1 marks the lens mounting plate. The lenses 2 may be mounted on this plate in any usual manner. As mounted they are secured by a plate 3 which has an internally extending flange extending over the lens and an external flange resting on the mounting plate. Eye guards 4 are flanged at their inner ends, these flanges also resting on the lens mounting plate.

Barrels 5 extend forwardly from the lenses. These have the inwardly extending flanges 6 at their inner ends arranged over the flanges on the plate, 3, and screws 7 extend through the several flanges securing the parts 1, 3, 4 and 6 together and at the same time securing the lenses.

The front ends of the barrels 5 have the internally extending flanges 8 and a view defining plate 9 is secured at the front of the barrels by screws 10 which extend into the flanges 8. The plates have openings 11 of the outline and size to give a satisfactory outline to the view.

A telescopic guide sleeve 12 is secured on the plate 9 and telescopic sections 13 operate in this guide. A brace 14 extends from the guide to the plate 9 strengthening the connection between the plate 9 and guide 12. A view holder 15 is secured at the front end of the telescopic slides in the usual manner.

With this stereoscope the view is sharply defined by the openings 11 and the vision is concentrated on the view by reason of the enclosure of the vision space.

What I claim as new is:—

1. In a stereoscope, the combination of a pair of stereoscopic lenses; a mounting for said lenses; separate barrels for the lenses extending forward from the mounting in front of the lenses; and a view holder in front of and spaced from the barrels; a view holder support secured to the barrels, the barrels forming a frame between the support and the mounting and being of a length confining the sight from each lens to a view at its side of the holder and the space from the barrel to the holder being open to the light.

2. In a stereoscope, the combination of a pair of stereoscopic lenses; a mounting for said lenses; separate barrels for the lenses extending forward from the mounting in front of the lenses; a view holder in front of and spaced from the barrels, the barrels being of a length confining the sight from each lens to a view at its side of the holder and the space from the barrel to the holder being open to the light; and a view margin defining device at the front ends of the barrels.

3. In a stereoscope, the combination of a pair of stereoscopic lenses; a mounting for said lenses; separate barrels for the lenses extending forward from the mounting in front of the lenses; a view holder in front of and spaced from the barrels, the barrels being of a length confining the sight from each lens to a view at its side of the holder and the space from the barrel to the holder being open to the light; and a view margin defining device at the front ends of the barrels comprising a plate forming the front frame for the barrels.

4. In a stereoscope, the combination of a pair of stereoscopic lenses; a mounting for the lenses; separate barrels for the lenses extending forward from the mounting in front of the lenses; a connecting frame at the front of the barrels; and a view holder mounted on said frame, said barrels forming a connecting frame between the front frame and the mounting.

5. In a stereoscope, the combination of a pair of stereoscopic lenses; a mounting for said lenses; separate barrels for the lenses extending forward from the mounting in front of the lenses; a view holder in front of and spaced from the barrels, the barrels being of a length confining the sight from each lens to a view at its side of the holder and the space from the barrel to the holder being open to the light; and a view margin defining device at the front ends of the barrels comprising a plate forming the front frame for the barrels to which the view holder is attached.

6. In a stereoscope, the combination of a pair of stereoscopic lenses; a mounting in the form of a plate to which the lenses are secured; barrels having internal flanges at their front and rear ends, the rear flange being secured to the mounting plate and surrounding the lenses; a connecting plate secured to the front flanges; and a view holder mounted on the connecting plate.

In testimony whereof I have hereunto set my hand.

BENNEVILLE L. SINGLEY.